UNITED STATES PATENT OFFICE.

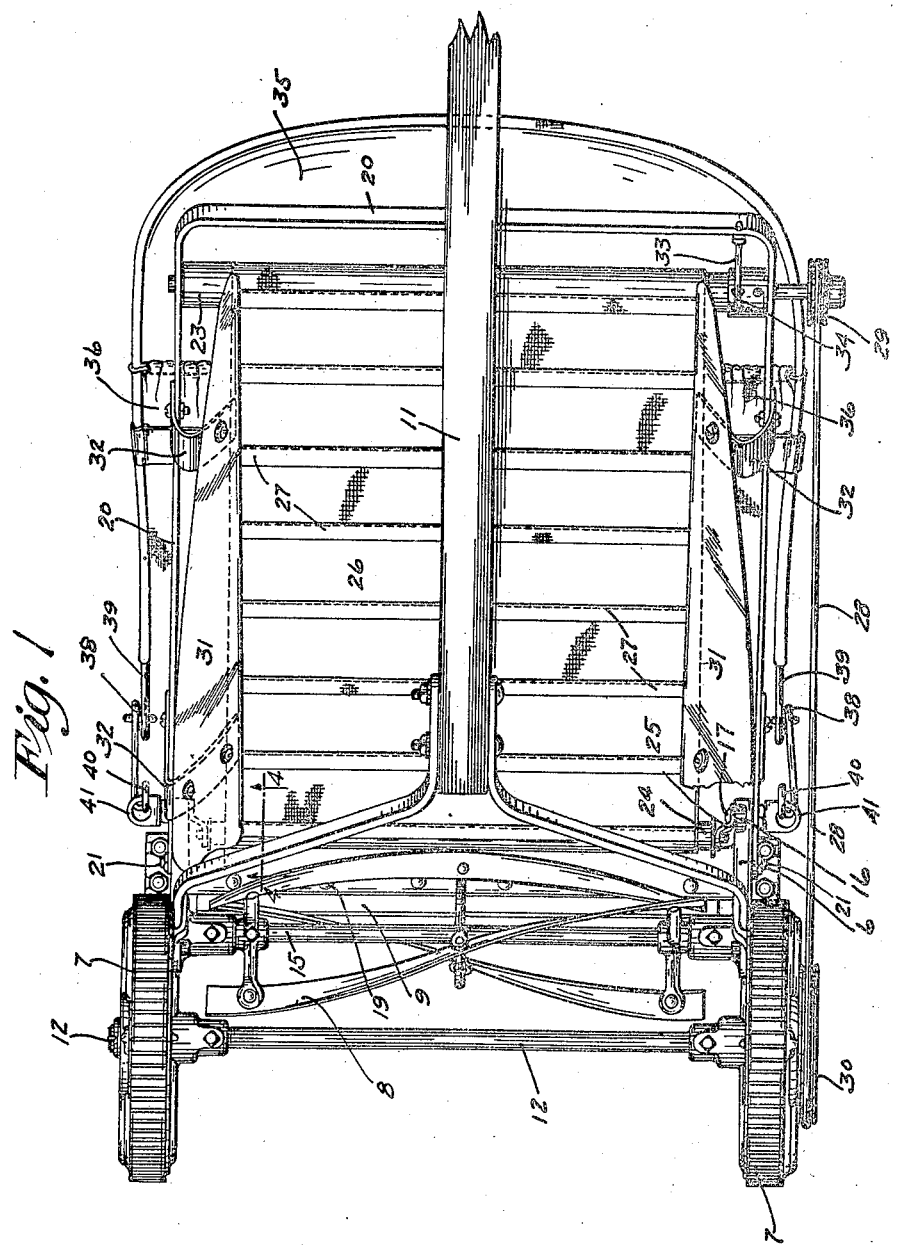

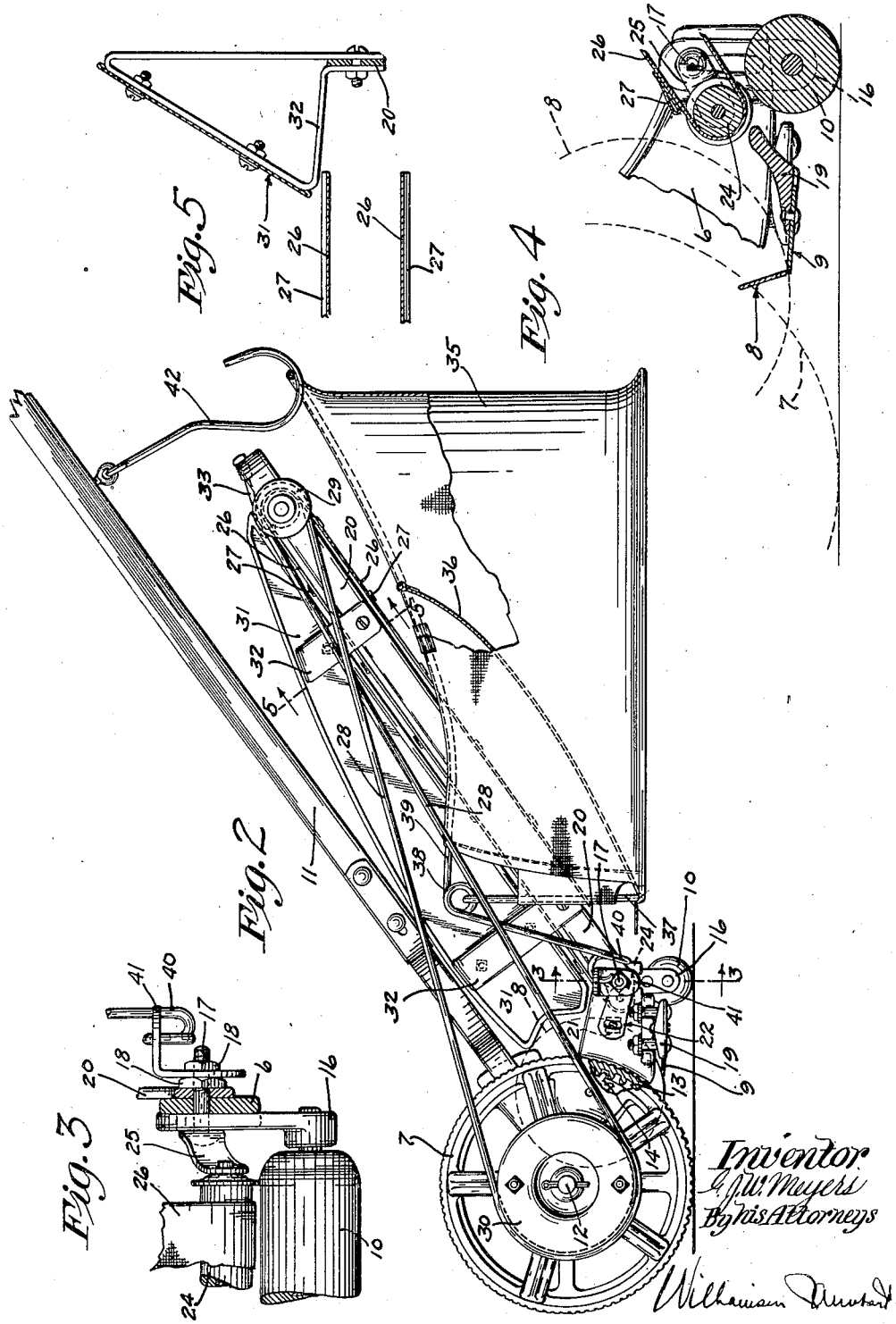

GEORGE J. W. MEYERS, OF MINNEAPOLIS, MINNESOTA.

GRASS ELEVATOR AND CARRIER ATTACHMENT FOR LAWN-MOWERS.

1,369,258.  Specification of Letters Patent.  Patented Feb. 22, 1921.

Application filed December 31, 1919. Serial No. 348,706.

*To all whom it may concern:*

Be it known that I, GEORGE J. W. MEYERS, a citizen of the United States, residing at Minneapolis, in the county of Hennepin and State of Minnesota, have invented certain new and useful Improvements in Grass Elevator and Carrier Attachments for Lawn-Mowers; and I do hereby declare the following to be a full, clear, and exact description of the invention, such as will enable others skilled in the art to which it appertains to make and use the same.

My invention has for its object to provide a grass elevator and carrier attachment for lawn mowers, and to this end, it consists of the novel devices and combinations of devices hereinafter described and defined in the claims.

In the accompanying drawings, which illustrate the invention, like characters indicate like parts throughout the several views.

Referring to the drawings:—

Figure 1 is a plan view of a lawn mower having the attachment applied thereto;
Fig. 2 is a side elevation of the same, with some parts broken away and sectioned;

Fig. 3 is a detail view partly in elevation and partly in section taken on the line 3—3 of Fig. 2, on an enlarged scale;
Fig. 4 is a detail view principally in section taken on the line 4—4 of Fig. 1, on an enlarged scale, with some parts diagrammatically illustrated by means of broken lines; and Fig. 5 is a detail view principally in section taken on the line 5—5 of Fig. 2.

Of the parts of the lawn mower illustrated, it is important to note the side frames 6, traction wheels 7, rotary spiral cutting blades 8 and coöperating stationary cutting blade 9, roller 10 and push handle 11. The traction wheels 7 are loosely journaled on the ends of a fixed shaft 12, which also affords a tie-rod which connects the side frames 6. Formed in the traction wheels 7 are internal gears 13, with which mesh pinions 14 secured by one-way pawls, not shown, on the ends of a driving shaft 15 journaled in the side frames 6, and which shaft carries the spiral blades 8.

The roller 10 is journaled in bearings 16 slidably mounted in vertical ways in the inner faces of the side frames 6 and secured in different adjustments by nut-equipped bolts 17 which extend through bores in the said side frames and vertical grooves in said bearings. These bolts 17, the heads of which bear against the inner faces of the side frames 6, are square in cross section, adjacent to their heads, for engagement with the vertical slots in the bearings 16, which holds said bolts against turning movement. On the outer projecting end of each bolt 17 is a pair of nuts 18, the inner of which react against the side frames 6 to draw the heads of said bolts against the bearing and frictionally clamp the same against said side frames.

The stationary blade 9 is secured to a tie-bar 19 which connects the side frames 6 just forward of the roller 10 and is provided at its back with an upwardly and rearwardly diverging flange provided to deflect the grass as it is cut by the blades 8 and 9 over said roller and onto an elevator as will presently appear.

The parts thus far described are of standard and well known construction and have been illustrated simply for the purpose of showing the invention applied in working position.

Referring now in detail to the invention, the numeral 20 indicates an upwardly and rearwardly inclined U-shaped frame, the prongs of which embrace the side frames 6 and are connected thereto by the bolts 17, which extend through bores formed therein. To further secure the elevator frame 20 to the side frames 6, short nut-equipped bolts 21 are inserted through bores in said side frames and slots 22 in the prongs of the elevator frame 20. The slots 22 permit the inclination of the elevator frame 20 to be changed by loosening the bolts 21 and moving said frame on the bolts 17 as pivots.

An upper or driven roller 23 is journaled in the sides of the elevator frame 20, at the top thereof, and an idle or lower roller 24 is journaled in bearing lugs 25 secured to the bolts 17. These bearing lugs 25 have square openings through which the squared sections of the bolts 17 extend to hold said bearing lugs against turning movement on said bolts.

Arranged to run over the rollers 23 and 24 is an endless elevator apron 26, of canvas or other suitable material, having formed therewith or attached thereto slabs 27, of the same material as said apron or any other suitable material. It is important to note that the axis of the lower roller 24 is offset to one side of a plane extending through the axis of the roller 23 and the bolts 17. By thus offsetting the roller 24, the tension of the elevator apron 26 may be varied, at will by shifting the inclination of the elevator frame 20 to change the angle between the rollers 23 and 24 and bolts 17.

The upper roller 23 is driven by a crossed belt 28, which runs over a grooved sheave 29 keyed to the left-hand end of the shaft of said upper roller and over a grooved wheel 30 detachably secured to the outer face of the left-hand traction wheel 7. By reference to Fig. 4, it will be noted that the roller 24 is located over and slightly forward of the roller 10 to direct the elevator apron 26 close to the tie-bar 19 so that, as the grass is cut by the blades 8 and 9, the same is thrown onto the upwardly moving upper section of said apron.

For holding the grass on the elevator apron 26, there is provided upwardly diverging side plates 31 secured to the sides of the frame 20 by brackets 32, with their lower longitudinal edges overlying the longitudinal edges of said apron. To prevent a movement of the elevator apron 26 that would carry the cut grass thereon back onto the cutting blades 8 and 9, when the lawn mower is drawn backward, there is provided a one-way pawl 33, carried by the transverse portion of the frame 20 and arranged to engage ratchet teeth 34 on the upper roller 23.

Grass carried upward on the elevator apron 26 is precipitated therefrom over the upper roller 23 into a carrier basket 35, which, as shown, is of the type now commonly used as attachments for lawn mowers, with the exception that the front thereof is closed by an apron 36.

The basket 35 has in its bottom edge a U-shaped spreader frame 37, the prongs of which extend forward and, at the front edge of said basket, extend vertically upward and flexibly interlock with eyes 38 formed in the forwardly projecting prongs of a U-shaped spreader frame 39 secured in the upper edge of said basket. The prongs in the frame 39, at the eyes 38, extend downward and terminate in hooks 40, which detachably interlock with perforations in brackets 41 mounted on the bolts 17 and clamped between the pairs of nuts 18, as best shown in Fig. 3. A hook 42, secured to the handle 11, detachably supports the rear end of the basket 35 at the transverse portion of its frame 39. The sides of the basket 35 embrace the elevator frame 20 and the apron 36 is so located as to not interfere with the elevator apron 26.

From the above description, it is evident that the elevator attachment may be very easily and quickly applied to lawn mowers of various different makes of coöperative standard carrier baskets now in use. By placing the apron 36 in the basket 35, a large amount of grass may be carried in the basket 35 without danger of spilling, and when the basket is full of grass, the same may be readily detached from the lawn mower and emptied without interfering with the elevator attachment. The transverse slats, of course, hold the grass on the elevator apron 26 and, as previously stated, by the use of the apron 36, the basket may be packed full of grass without danger of spilling any of it, thereby permitting an operator of the lawn mower to cover much more ground without having to empty the basket. The apron 36 also prevents the grass from spilling out of the basket 35 when the lawn mower is traveling down a terrace or other embankment.

The above described invention has, in actual usage, proven highly efficient for the purpose had in view.

What I claim is:—

1. The combination with a lawn mower including a ground-engaging roller, bearings for the roller and bolts securing the bearings to the side frames of the lawn mower, of a carrier attachment for the lawn mower, a rearwardly inclined elevator frame pivoted on said bolts, upper and lower rollers, the former of which is journaled in the elevator frame and the latter of which is journaled in a second set of bearings secured to the side frames by the bolts, an endless elevator apron arranged to run over the upper and lower rollers, said bolts being offset from a plane that intersects the axis of the rollers and means for driving one of the apron rollers.

2. The combination with a lawn mower including a ground-engaging roller, bearings for the roller and bolts securing the bearings to the side frames of the lawn mower, of a carrier attachment for the lawn mower, a rearwardly inclined elevator frame having its lower ends pivoted on the bolts, means for securing the elevator frame to the side frames against pivotal movement on the bolts at different inclinations, upper and lower rollers, the former of which is journaled in the elevator frame and the latter of which is journaled in bearings secured to the side frames by the bolts, an endless elevator apron arranged to run over the upper and lower rollers, a pair of alined wheels attached the one to one of the traction wheels of the lawn mower and the other to the upper apron roller, and a belt arranged to run over said alined wheels, said bolts being laterally offset from a plane extending through the axis of the pair of alined wheels.

3. The combination with a lawn mower, of a carrier having an open front end, an upwardly and rearwardly inclined elevator secured to the lawn mower and extending between the sides of the carrier at the front thereof, said elevator arranged to receive from the cutters of the lawn mower and deposit into the carrier, and an inclined apron extending obliquely through the carrier and attached to the lower front edge thereof.

In testimony whereof I affix my signature in presence of two witnesses.

GEORGE J. W. MEYERS.

Witnesses:
WINIFRED I. WARD,
HARRY D. KILGORE.